United States Patent
Dames et al.

(10) Patent No.: US 8,055,999 B2
(45) Date of Patent: *Nov. 8, 2011

(54) METHOD AND APPARATUS FOR REPURPOSING FORMATTED CONTENT

(75) Inventors: Dwayne Dames, Boynton Beach, FL (US); David E. Reich, Jupiter, FL (US); Ji Wee Tan, West Palm Beach, FL (US); Fang Wang, Irving, TX (US); Lenora Wright, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 701 days.

This patent is subject to a terminal disclaimer.

(21) Appl. No.: 12/196,723

(22) Filed: Aug. 22, 2008

(65) Prior Publication Data

US 2008/0313532 A1 Dec. 18, 2008

Related U.S. Application Data

(63) Continuation of application No. 09/800,330, filed on Mar. 6, 2001, now Pat. No. 7,546,527.

(51) Int. Cl.
*G06F 17/27* (2006.01)
(52) U.S. Cl. ........ 715/234; 715/243; 715/248; 715/249; 715/255
(58) Field of Classification Search ............... 715/234, 715/243, 248–249, 255
See application file for complete search history.

(56) References Cited

U.S. PATENT DOCUMENTS

| | | | |
|---|---|---|---|
| 5,119,491 A | 6/1992 | Iwai et al. | |
| 5,860,073 A | 1/1999 | Ferrel et al. | |
| 5,911,776 A | 6/1999 | Guck | |
| 6,055,522 A | 4/2000 | Krishna et al. | |
| 6,073,148 A | 6/2000 | Rowe et al. | |
| 6,085,186 A | 7/2000 | Christianson et al. | |
| 6,286,043 B1 | 9/2001 | Cuomo et al. | |
| 6,421,733 B1 | 7/2002 | Tso et al. | |
| 6,442,523 B1 | 8/2002 | Siegel | |
| 6,477,565 B1 | 11/2002 | Daswani et al. | |
| 6,507,410 B1 | 1/2003 | Robertson et al. | |
| 6,658,626 B1 | 12/2003 | Aiken | |
| 6,732,102 B1 | 5/2004 | Khandekar | |
| 2001/0042083 A1 | 11/2001 | Saito et al. | |
| 2002/0054090 A1 | 5/2002 | Silva et al. | |
| 2002/0107881 A1 | 8/2002 | Patel | |
| 2002/0116421 A1 | 8/2002 | Fox et al. | |

FOREIGN PATENT DOCUMENTS

| | | |
|---|---|---|
| JP | 09-160917 | 6/1997 |
| JP | 11-143910 | 5/1999 |
| JP | 2000-194612 | 7/2000 |
| JP | 2000-222429 | 8/2000 |

*Primary Examiner* — Doug Hutton, Jr.
*Assistant Examiner* — Andrew Dyer
(74) *Attorney, Agent, or Firm* — Novak Druce + Quigg LLP

(57) ABSTRACT

A method and system for reformatting data. The method involves a series of steps which can include identifying a template which corresponds to a specified document. The specified document can contain formatted data. Additionally, the step of applying a template to the specified document can be extracting data from the formatted content. The step of formatting the data using a different markup language can be performed.

19 Claims, 2 Drawing Sheets

METHOD AND APPARATUS FOR REPURPOSING FORMATTED CONTENT

CROSS REFERENCE TO RELATED APPLICATIONS

This application is a continuation of, and accordingly claims the benefit of, U.S. patent application Ser. No. 09/800,330, filed with the U.S. Patent and Trademark Office on Mar. 6, 2001, now U.S. Pat. No. 7,546,527.

BACKGROUND OF THE INVENTION

1. Technical Field

This invention relates to the field of markup language processing, and more particularly, to processing data formatted using one markup language into data usable by another markup language.

2. Description of the Related Art

Markup languages aid computers in interpreting how data can be presented through a user interface. Typically, presentation information provided by a markup language in the form of tags can be inserted in a document around particular data to be formatted. For example, Hypertext Markup Language (HTML), the predominant markup language used on the Internet, provides information to a browser specifying how to display the data contained within an HTML formatted document. Other examples of markup languages can include eXtensible Markup Language (XML), Standard Generalized Markup Language (SGML), of which both HTML and XML are subsets, Wireless Markup Language (WML), and Handheld Device Markup Language (HDML). Generally, however, markup languages can include any set of data specifications which can define the presentation of data contained in a document.

As computer communications networks become more advanced, new services are regularly being introduced to end users. One such service is providing data from the Internet, referred to as content, to an end user through a speech interface. For example, the user can listen to content processed through a speech interface and delivered to a cellular telephone in the form of audio, rather than viewing the content through a browser implemented on a personal digital assistant (PDA) or a cellular telephone. Presentation of data in this manner can be advantageous for mobile applications. Particularly, voice interfaces offer users an intuitive, hands-free method, as well as an eyes-free method, of obtaining Internet content.

Voice eXtensible Markup Language (VoiceXML) is a markup language which can be used to format data for presentation through a speech interface. Version 1.0 of the VoiceXML specification has been published by the VoiceXML Forum in the document by Linda Boyer, Peter Danielsen, Jim Ferrans, Gerald Karam, David Ladd, Bruce Lucas, and Kenneth Rehor, *Voice eXtensible Markup Language (VoiceXML□) version 1.0*, (W3C May 2000). Additionally, version 1.0 of the VoiceXML specification has been accepted by the World Wide Web Consortium (W3C) as a proposed industry standard.

The vast amount of content presently available on the Internet has not been formatted using VoiceXML or another audio directed markup language format. Rather, most content has been formatted using HTML. For speech interface driven systems to process existing Internet content which has been formatted in HTML, the formatted content first must be converted to VoiceXML formatted content. Alternatively, the HTML content can be reformatted using another suitable audio directed markup language.

Presently, a process referred to as "transcoding" can be used to translate a document formatted in one markup language into a document formatted using a second markup language. Essentially, transcoding involves identifying tags of the first markup language and substituting them with corresponding tags of the second markup language. For example, in transcoding a document from HTML to VoiceXML, each HTML tag can be replaced with a corresponding VoiceXML tag. The resulting transcoded document then can be presented through a speech interface. In this manner, a transcoder can translate a document formatted in one markup language into a document formatted in another markup language.

Still, there can be disadvantages to transcoding markup languages of different modalities, where modality refers to the human sense to which the presentation of data is directed. For example, HTML is directed toward visual presentation of data. VoiceXML is directed to speech or audio directed presentation of data. One such disadvantage is that a change of modality in the presentation of content, from text to speech, can result in nonsensical sounding speech produced by a speech interface. Specifically, mere substitution of visually directed HTML tags with speech directed VoiceXML tags can result in documents that, when read by a speech interface, sound confusing to a listener. For example, tabular data formatted in HTML can be clearly viewed by end users. Although an HTML table can be recognized and retagged using VoiceXML for processing by a speech interface, the speech interface typically does not know a suitable way to audibly present the table in a comprehendible and user friendly manner. Specifically, the speech interface can present the table entries randomly, by row, or by column, each being potentially confusing to a listener. Thus, mere substitution of tags does not account for differing user interfaces.

Moreover, transcoding necessitates tailoring user interactions to the interface, rather than tailoring the interface to the data presentation medium. For example, a user may wish to obtain a single portion of information or entry from a table formatted in HTML. However, after transcoding the HTML formatted document into a VoiceXML document, the user can be forced to listen to the entire poorly ordered table being audibly produced by a speech interface. Such situations can cause listener fatigue thereby defeating the advantages of a speech interface. Presentation of data in a structure suitable for interpretation by a speech interface can overcome listener fatigue, providing a more user friendly solution.

Another disadvantage of transcoding can be poor structuring of transcoded documents. For example, the organizational structure of a VoiceXML document can differ significantly from the structure of an HTML document due to the different modalities of each markup language. Moreover, replacing tags without regard to data placement within the document can result in fragmented data throughout the transcoded document. Accordingly, problems still exist with regard to transcoding markup languages of different modalities.

SUMMARY OF THE INVENTION

The invention provides a method and a system for extracting data from a document formatted using one markup language and presenting the extracted data using a second, different markup language. Based upon a received content request, the invention can obtain a first document from a location in a computer communications network. After processing, the invention can create a second document formatted using a second, different markup language. Thus, the second document can contain the extracted data from the first document formatted using the second, different markup language. Notably, the second, different markup language can correspond to the content request which further can specify the format in which the extracted data is to be presented.

The inventive method taught herein can begin by identifying a template which corresponds to a specified document. The identified template can be applied to the formatted content and can be used to parse data from the content. The templates can include one or more content markers which can contain an offset within a document where data can be formed, an identifier indicating the type of data to which the content marker points, and a value indicating the length of a data field, or alternatively, another offset indicating the end of a data field. The specified document can include formatted content. The method can include applying the template to the specified document. Specifically, the application can include extracting data, which can be unformatted data, from the formatted content. The formatted content can be Hypertext Markup Language (HTML), eXtensible Markup Language (XML), Standard Generalized Markup Language (SGML), Wireless Markup Language (WML), Handheld Device Markup Language (HDML), or VoiceXML formatted content. The additional step of formatting the data using a different markup language can be included, where the different markup language can be HTML, XML, SGML, WML, HDML, or VoiceXML. Notably, the formatting produces a second document, where the specified document and the second document can be of a different modality.

Another embodiment can include receiving a content request where the content request can specify a network location from which the specified document can be retrieved. The method can include the steps of retrieving the specified document from the network location, and presenting the second document through a user interface. Notably, the user interface can be a speech interface.

The extracting of data can include reading data in the formatted content from an offset within the specified document. The offset can be identified by a content marker within the template. Additionally, the method can include reading a data identifier from the content marker.

Another embodiment can be a method of configuring a content converter including determining at least one data location within one or more specified documents containing formatted content. The step of constructing at least one template having one or more content markers which correspond to the data location can be included. Each template can correspond to a specified document. Additionally, the method can include mapping the templates to the specified documents using a template table.

Another aspect of the invention can be a system for reformatting data which can include a buffer for receiving documents formatted in a first markup language. The system can include one or more templates for extracting data from formatted content in the documents, where the formatted content can be HTML, XML, SGML, WML, HDML, or VoiceXML formatted content. Each template can correspond to at least one document. Notably, the templates can include at least one content marker for locating data within the formatted content. Additionally, the content markers can include identifiers for identifying data within the formatted content. The system also can include a table of the templates associating the templates with the corresponding documents. Further, the system can include a formatter for formatting the data using a second markup language. Notably, the second markup language can be HTML, XML, SGML, WML, HDML, or VoiceXML. In addition, the first and second markup languages can be of a different modality.

Another aspect of the invention can be a machine readable storage, having stored thereon a computer program having a plurality of code sections executable by a machine for causing the machine to perform a series of steps. The steps can include identifying a template which corresponds to a specified document. The specified document can include formatted content. The additional step of applying the template to the specified document can be included where the application can include extracting data from the formatted content. The formatted content can be HTML, XML, SGML, WML, HDML, or VoiceXML formatted content. Further, the step of formatting the data using a different markup language, where the formatting step produces a second document can be included. Notably, the specified document and the second document can be of a different modality. The different markup language can be HTML, XML, SGML, WML, HDML, or VoiceXML.

The machine readable storage can contain additional code sections for causing the machine to perform the steps of receiving a content request where the content request can specify a network location from which the specified document can be retrieved. The step of retrieving the specified document from the network location also can be included. The additional step of presenting the second document through a user interface, such as a speech interface, further can be included.

The extracting of data can include reading data in the formatted content from an offset within the specified document. The offset can be identified by a content marker within the template. Additionally, the step of reading a data identifier from the content marker can be included.

BRIEF DESCRIPTION OF THE DRAWINGS

There are shown in the drawings embodiments which are preferred, it being understood, however, that the invention is not so limited to the precise arrangements and instrumentalities shown, wherein.

DETAILED DESCRIPTION OF THE INVENTION

Figure 1:
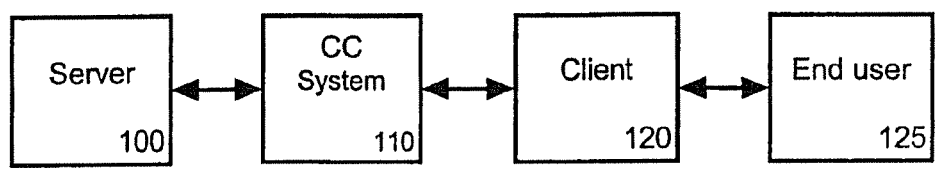
FIG. 1 depicts an exemplary network configuration utilizing the system of the invention.

The invention disclosed herein provides a method and a system for extracting content formatted using one markup language for formatting with another markup language. Specifically, content in a document formatted using a first markup language can be extracted for presentation within a second, newly created document, wherein the newly created document is formatted using a second, different markup language. Notably, the markup languages can differ in modality. For example, the first markup language can be directed to presentation of visual text; and, the second markup language can be directed to presentation of speech. Examples can include Hypertext Markup Language (HTML) and Voice eXtensible Markup Language (VoiceXML), respectively.

Generally, the invention involves selecting web pages from which information is to be extracted. The information can be extracted using templates which correspond to the web pages.

The templates can be stored in a data structure in memory to be retrieved upon a user requesting a web page for which a template exists. Thus, the invention can extract information only from documents for which corresponding templates exist. Notably, the data structure can associate the templates with locations of corresponding documents in a computer communications network, such as URLs. For example, documents or web pages, such as sports news web sites, financial news web sites, current events web sites, or any other web site having desirable content can be selected. For each web page selected, a template can be constructed for extracting content contained in the document. It should be appreciated that the templates can be customized so that particular information from a document can be extracted. Alternatively, the templates can be customized so that any information contained in the documents can be extracted in varying combinations, including all of the information contained in the document. For example, in the case of a sports news web page, the location of particular information such as the score of a particular sporting event or league standings, such as the AFC standings of the National Football League, can be identified for extraction. Similarly, the template can be customized to return only scores of AFC games contained in the web page. It should be appreciated that templates can be edited, and thus, can be adaptable to changing document formats and document content. Additionally, the data structure containing the templates can be edited to accommodate changing document locations in a computer communications network. Moreover, new templates continually can be added to the CC system for any document existing on a computer communications network having a specified location on the network.

Specifically, a Content Converter (CC) system can receive a content request from a client. The content request can be in the form of a uniform resource locator (URL), and can specify a document containing the requested content. The CC system can transmit the content request to a computer communications network or the Internet. Subsequently, the CC system can receive the requested document corresponding to the client request. Notably, the received document can contain content formatted using HTML, eXtensible Markup Language (XML), Standard Generalized Markup Language (SGML), of which HTML and XML are subsets, Wireless Markup Language (WML), Handheld Device Markup Language (HDML), VoiceXML, or any other markup language.

Upon receiving the document containing the formatted content, the CC system can locate an entry associated with the received document within a template table. The template table can contain a listing of templates in the CC system where each template can be associated with a document location in a computer communications network, such as a URL. In this manner, an entry in the template table can specify a template corresponding to the received document. The specified template can be applied to the formatted content and can be used to extract or parse data from the content. For example, where specific text has been formatted to appear italicized, the template can extract the text without regard for the italicization. Notably, the CC system can contain multiple templates, where each template can correspond to a particular URL associated with a document. Thus, by accessing the template table, the CC system can identify a template which corresponds to a particular URL for extracting unformatted data from the formatted content contained in the received document.

After extracting the unformatted data from the received document, the CC system can repurpose the data using a second, different markup language. Specifically, the CC system can create a second markup language document by applying the extracted data to the second, different markup language document. The newly created document can be provided to a client. Notably, the newly created document and the received document can be of a different modality. For example, after extracting data from an HTML document, the CC system can repurpose the data using VoiceXML to be provided to an end user through a speech interface. It should be appreciated, however, that the invention is not so limited to creating documents having different modalities from the received document. For example, the received document and the resulting document each can be formatted in any of a variety of markup languages including, but not limited to, HTML, XML, SGML, of which HTML and XML are subsets, WML, HDML, VoiceXML, or any other markup language, wherein the received document and the resulting document are formatted in different markup languages.

The invention also concerns a method of configuring the CC system. The method includes selecting documents, such as web pages, from which to extract data. These documents, containing formatted content, can be analyzed to determine locations within the documents where data exists. For example, any document having a specified location within a computer communications network, such as a URL, can be analyzed to determine the location within the document where data exists. Additionally, the type of data and the length of the data fields within the specified documents also can be determined. For each document analyzed, a corresponding template can be constructed. The template, similar to a configuration file, can be constructed containing at least one content marker corresponding to determined data locations within the document. Notably, the content marker can contain information regarding the type of data to which the marker points, as well as the length or end point of the data. Each data item to be extracted or parsed from a document can have a corresponding content marker in the template corresponding to that document. After constructing the templates, the templates can be included in a data structure, such as a template table, which can map the templates to specified documents. The template table also can be similar to a configuration file for matching templates to documents. For example, the templates can be associated with a document location in a computer communications network, such as a URL. In this manner, a template can be identified from the template table based upon a user requested document location.

FIG. 1 depicts an exemplary computer communications network configuration containing a server 100, a CC system 110, a client 120, and an end user 125. Information can be supplied from the server 100 through a computer communications network or the Internet to the client 120 for presentation to an end user. Common examples of client/server relationships depicted in FIG. 1 can include a proxy server to an Internet web server, an end user workstation to a proxy server, an end user workstation to a service provider's server, or an intelligent router to a proxy server. It should be appreciated that the aforementioned examples are for illustration only and the invention is not so limited to the particular examples disclosed.

As shown in FIG. 1, CC system 110 can operate as an interface between the client 120 and the server 100. CC system 110 can be a computer program written in C or another suitable programming language. Although the CC system 110 is depicted as being a separate component, it should be appreciated that CC system 110 can be located within the server 100, a proxy server (not shown), the client 120, or any combination thereof. Moreover, the CC system 110 can be located anywhere within the client/server path of communication such that CC system 110 can process received documents prior to providing newly created documents through a suitable user interface. This increases the usefulness so as not to require the system to conform to the network, but rather this invention enables the system to work in any network. For example, if the user interface is a speech interface residing in the client 120, the CC system 110 also can be located in the client 120. In that case, the systems can be configured such that the CC system can process received documents before providing the newly created documents to the speech interface. This configuration can allow the CC system to process documents and provide voice directed documents to the speech interface for ultimate presentation to an end user.

Figure 2:
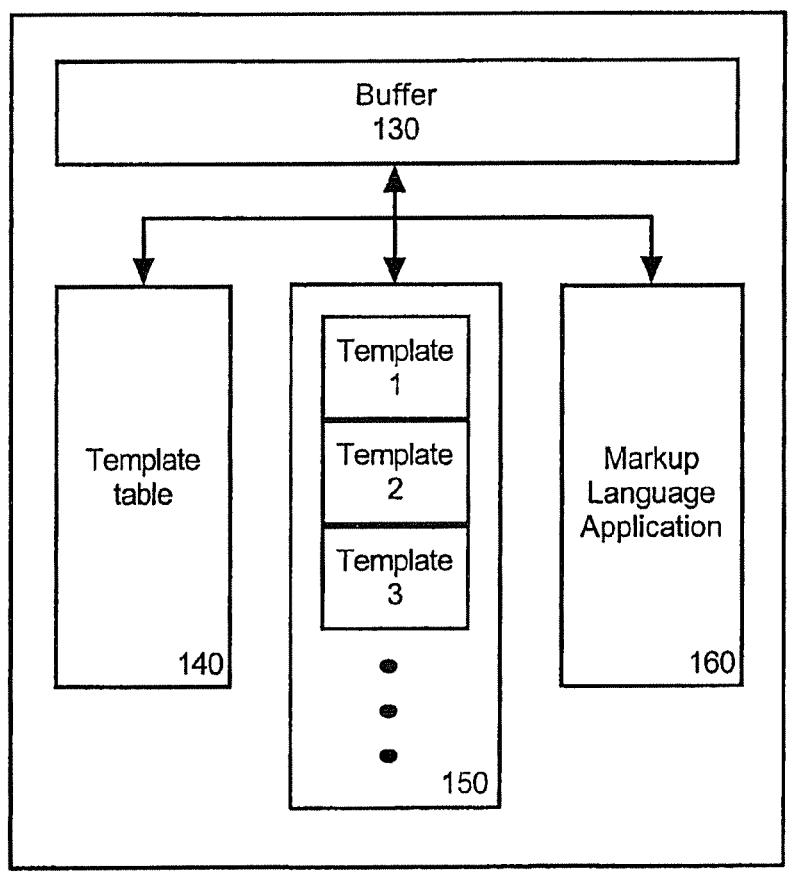
FIG. 2 is a schematic diagram illustrating an exemplary system for converting content formatted in one markup language into content formatted using another markup language.

A CC system 110 in accordance with the inventive arrangements is shown in FIG. 2. The CC system can include a buffer 130 for receiving content requests and documents, a template table 140, one or more templates 150, and a markup language application 160.

Template table 140 can contain references to one or more templates 150. The entries in template table 140 can contain a network location identifier from which a document can be retrieved. For example, the identifier can be a URL corresponding to a web page. The entries in template table 140 also can include a corresponding template identifier or pointer such that templates can be associated with particular documents. The templates 150 can include one or more content markers which can indicate an offset within a document where data can be found. For example, an offset can be a byte number or byte location within a document where data begins. Each content marker further can include an identifier indicating the type of data to which the content marker points. Additionally, the content markers can contain a value indicating the length of a data field, or alternatively, another offset indicating the end of a data field.

For example, one exemplary template 150 can correspond to a particular weather related web page. The template 150 can be programmed such that the content markers correspond to data field offsets within documents. Specifically, the template can have a content marker indicating a city data field and a content marker indicating a temperature data field for the corresponding web page. With the offsets specified in the content markers, the CC system 110 can identify text located at the specified offsets. For example, the offset value can be specified as a byte offset within the specified web page. In this manner, the CC system can extract a city name and corresponding temperature for that city from a received document, such as an HTML web page, without regard to the markup language surrounding the data.

In one embodiment, the ordering of the content markers within the templates can determine the ordering of data as ultimately presented in the newly created document using the second markup language. In particular, data can be presented using the second markup language in the order in which it was extracted from the received markup language document. Thus, the order of the content markers in the template can dictate the order of presentation using the second markup language. For example, a template for a weather related website can contain ordered content markers such that the first content marker points to a city, the second content marker points to the expected daily high temperature, and the third content marker points to the expected daily low temperature. Though the aforementioned data may be fragmented throughout the received document, the data can be extracted in the order specified by the content markers thereby making a sensible presentation for an end user. Specifically, the data can be formatted using VoiceXML such that an end user can hear "Miami high today of X, low today of Y". Notably, the type of content markers, the offsets contained in the content markers, and the ordering of the content markers can be determined and programmed template by template, and web page by web page. Additionally, the CC system can contain multiple templates for each entry within the template table. For example, a single web page can have a template for formatting data in VoiceXML, and another template for formatting in data in HDML. In this embodiment, multiple templates can be used as the ordering of content markers can depend on the client requested data presentation format and the correlating markup language. Thus, just as a content request can specify a document formatted in VoiceXML, the content request can specify that a document be returned formatted in HDML for presentation on a handheld device. In this case, the CC system can convert the received HTML document into an HDML document. New templates can continually be updated and added to the CC system.

The markup language application 160 can reformat the extracted data from the received document for presentation as a new document formatted using a different markup language. The markup language application 160 can interpret the received content request to determine which markup language can be used to properly format the extracted data. For example, the request can specify that the extracted data be formatted for use with a speech interface. Thus, the markup language application 160 can format the extracted data using VoiceXML. Alternatively, if the client request specifies data formatted for use with a personal digital assistant (PDA), the markup language application 160 can format the extracted data using HDML. Regardless of the client request received, the markup language application 160 can read the client request to determine the specified markup language for formatting the extracted data. By referencing the template table 140 and the appropriate template 150, the markup language application 160 can determine the data and type of data extracted for proper formatting in the client requested markup language.

In another embodiment of the invention, the ordering functionality of the content markers in the templates can be implemented within the markup language application 160. In that case, each document can have a single corresponding template for extracting data. Thus, the functionality for ordering data for presentation using the new markup language can be built into the markup language application 160. In particular, the markup language application 160 can identify the requested output format of the client request, correlate the output format with the type of data extracted using the template, and reformat the data within the new markup language according to the client request and content markers within the template. For example, the markup language application 160 can read the content markers within a template and determine an ordering of the data through internal logic.

Regardless of how the data is ordered, it should be appreciated that particular content markers within the templates can be associated with particular markup language tags, code, and text. Thus, data presentation can be customized on a template by template basis, and therefore, on a document by document basis. Moreover, particular content markers can cause the markup language application 160 to insert text within the data for improved end user understanding. For example, rather than producing VoiceXML for causing a speech interface to say "Miami, 80, 75", the markup language application 160 can insert text such that an end user can hear "Miami, high today of 80, low today of 75". In this case, a high temperature content marker can cause the text "high today of" to be inserted before the extracted data "80". The low temperature content marker can cause the text "low today of" to be inserted before the extracted data "75".

Figure 3:
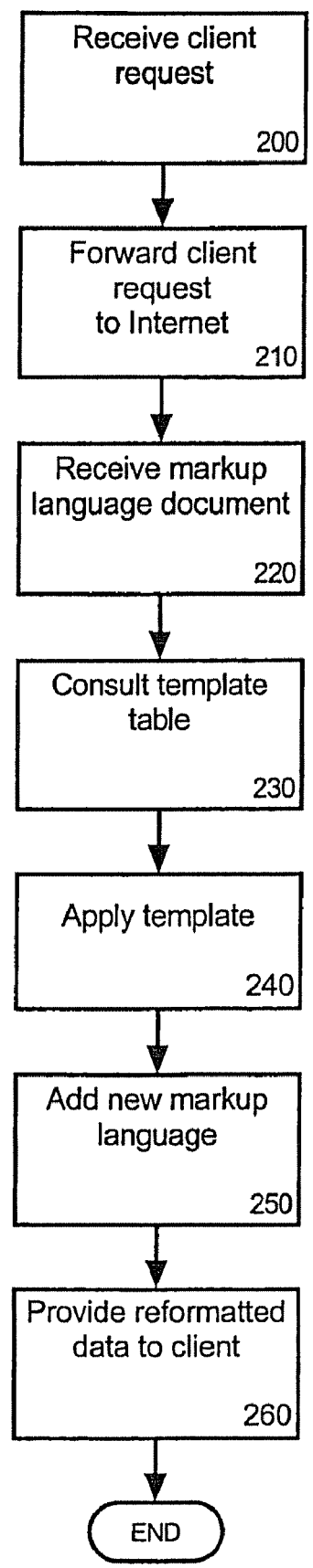
FIG. 3 is a flow chart illustrating a process for converting content formatted using one markup language into content formatted using another markup language.

FIG. 3 is a flow chart illustrating a process for extracting data from a document formatted using one markup language for presentation using another markup language as performed by the CC system 110 of FIG. 1. Beginning at step 200, the CC system 110 receives a content request from a client. The received client request can be formatted using Hypertext Transfer Protocol (HTTP) and TCP/IP to indicate a request for a particular URL corresponding to a web page. However, the request can be initiated by an interface other than a traditional computer based browser. For example, the request can be initiated by a speech interface or a browser for use with a cellular telephone or PDA requesting a document containing current stock quotes. The client request can contain an identifier indicating the format in which the requested information is to be received. For example, a request from a speech interface can contain an identifier indicating that data be returned to the client using VoiceXML rather than HTML or HDML. Thus, the CC system 110 can determine that data extraction from the user requested document and reformatting of the data using VoiceXML will be necessary. Notably, if the client request does not request a change of formatting, the CC system can simply become transparent to the computer communications network or Internet. In that case, information can freely pass unaffected by the CC system. After completion of step 200, the CC system proceeds to step 210.

In step 210, the CC system transmits the content request to the computer communications network or Internet. Notably, if the CC system is located within a proxy server, the proxy server can check its cache memory for the requested document. If the requested document is in the proxy server's cache memory, then the document can be supplied to the CC system without transmitting a request on the Internet or computer communications network. After completion of step 210, the system continues to step 220.

In step 220, the transmitted content request can be fulfilled by receiving a document from a server on the Internet or computer communications network. For example, the CC system can receive a web page in HTML format corresponding to the requested URL from a web server. Upon receipt of the requested document, the CC system can store the document in the CC system's buffer for further processing.

In step 230, the CC system can consult the template table to locate an entry corresponding the received document. For example, the entry can correspond to the URL of the received web page. The entry further can correspond to a particular template for extracting information from the received document. Thus, the CC system can identify the proper template for extracting information from the received document.

For example, if the client request indicated a particular URL for a web page concerning the stock market, the CC system can locate an entry in the template table corresponding to that web page. It should be appreciated that the template table can contain entries for web sites as well as web pages. Thus, the entries can specify a domain name as well as pages beneath the domain name. For example, the requested web page can be an HTML document containing stock related information where the corresponding template contains content markers identifying data fields and data types within the HTML document. If the CC system does not contain a template corresponding to the requested document, then the CC system can store the location of the requested document for constructing a corresponding template in the future. Additionally, the CC system can keep a count of requested documents for determining frequently requested documents. After completion of step 230, the CC system can continue to step 240.

In step 240, the CC system applies the identified template to the corresponding received document. Using content markers contained within the identified template, the CC system can extract information from the received document. Specifically, the CC system can interpret a content marker which can indicate the type of data to be extracted, as well as the offset of the data within the document. Additionally, the content marker can also contain a length value for determining how much of the data beyond the offset should be extracted. The offsets and lengths can be specified as byte offsets within the received document. Alternatively, the system can extract all data beginning at the content marker specified offset and continue until a symbol is reached indicating the end of a text field. In this manner, the CC system can extract information from the received document.

Using the template table, the CC system can locate the template corresponding to the received web page. If the CC system contains multiple templates per web page to accommodate different methods or modalities of presenting data, the CC system can identify the proper template based on the content request. Thus if the content request specified data presentation through a speech interface, the CC system can determine the proper template corresponding to the received document for presentation through a speech interface.

For example, an exemplary template corresponding to a stock market related web page can contain a content marker specifying that a data field called "NAME OF STOCK" begins at byte offset 100 within the markup language document. Accordingly, the CC system can extract the text found at byte offset 100 for the for the length specified in the content marker, or until an ending offset specified in the content marker is read. Alternatively, the CC system can extract data from the HTML document until a particular operator or character is reached, such as "<" indicating the end of a text field and the start of a tag. By applying templates with incorporated content markers in this manner, the CC system can extract information from an any HTML document, or other markup language document, having a corresponding template. After completion of step 240, the CC system can continue to step 250.

In step 250, the CC system can reformat the extracted data for presentation using another markup language. As mentioned, the ordering of the information to be presented can be determined through the ordering of the content markers within the template, or through logic built into the markup language application. In either case, the markup language application can identify particular content markers within the templates. Moreover, each type of content marker can be associated with particular actions such that predetermined markup language tags, code, and text can be added to the extracted data.

For example, in the case where the ordering of the information is determined by the ordering of content markers, the markup language application can prepare the information for presentation in the order in which the information was extracted from the received document. If the first content marker in the template points to a stock name, the second to a stock opening price, and the third to a current stock price, then the CC system can present the information to the client as a new document formatted using different markup language. Further, the data can be presented to an end user in the order specified by the ordering of the content markers or by the markup language application. The system can format the extracted data using the proper markup language, such as VoiceXML for presentation to a speech interface. Additionally, the system can add text to the extracted information for improved user comprehension. For example, instead of an end user hearing "Stock Name, $100, $110", the system can include text such that the end user hears "Stock Name, opened at $100, currently trading at $110". Notably, the inserted text within the extracted information can be stored within the markup language application such that a content marker directed at an opening price of stock can cause the markup language application to insert the text "opened at $" before the extracted data "100". Moreover, the CC system can insert appropriate VoiceXML tags around the data. In this manner, the CC system can provide properly formatted VoiceXML to a speech interface such that an end user can easily understand the presented data.

In step 260, the CC system provides the reformatted data, in the form of a newly created markup language document, to the client. Specifically, the newly created markup language document can be processed through a user interface. Examples of user interfaces can include browsers for viewing content formatted using visually directed markup languages and speech interfaces for processing audible speech. For example, the CC system can transmit a VoiceXML document to the client. Notably, the client or other computer such as a proxy server can be a computer having a speech interface. In that case, an end user can listen to content though a speaker where the speech interface can be a voice enabled browser within a computer system. Alternatively, the speech output from the speech interface further can be provided to an end user via a communications link. For example, an end user can listen to the content over a cellular telephone connection. It should be appreciated that the document provided to the client can be formatted using any client requested markup language including but not limited to XML, HDML, SGML, WML, or HTML.

The invention extracts data from documents, rather than merely substituting tags for a different markup language, so that the data can be reordered and reformatted for presentation using the second markup language. The reformatting and reordering of data can be performed based upon the requested modality or user interface type through which the data will be presented. Specifically, the data can be reordered and reformatted using the second markup language as opposed to preserving the format of the first document and performing tag substitution. For example, the CC system can determine an order in which the data is to be presented, as well as add text for clarity, during formatting of the extracted data using the second markup language for processing by a speech interface. This aspect of the invention also can result in improved structuring of newly created documents using the second markup language. Moreover, data fragmentation can be avoided. By avoiding data fragmentation throughout the newly created document, an end user can more easily understand the presented data. Because the existing templates can be updated and edited to accommodate changing document format and document content, and new templates can be added to the CC system as needed, the CC system is adaptable. Moreover, the template table can be updated and edited to accommodate changing document locations in a computer communications network. The use of templates can eliminate the need for complex logic for locating data within documents as the location of data can vary widely from document to document.

The present invention can be realized in hardware, software, or a combination of hardware and software. A method and system for converting content formatted using one markup language into content formatted using another markup language according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A system including a processor and a memory for reformatting data, the system comprising:
   a buffer for receiving documents formatted in a first markup language;
   a content converter system operating as an interface between a client and a server, the content converter system including one or more templates for extracting data from the received documents and presenting the extracted data in a second markup language, each template having at least one content marker for extracting data from said received documents in accordance with an ordering of the at least one content marker in the one or more templates, wherein said extracted data corresponds to at least one among a type of data and a particular action from formatted content in said documents, wherein each said template corresponds to at least one document and a second target markup language and is customizable by a user to extract in one or more combinations information from a corresponding at least one document based upon the at least one content marker, wherein each content marker indicates a data offset for identifying within the specified document data at least one data field containing information corresponding to the predetermined topic, and wherein the at least one content marker further specifies at least one among markup language tags, code, and additional text to associate with the information contained in a particular data field when presented in said second target markup language;
   a template table for associating each of said templates with a corresponding document, with a network location identifier of a particular document, and a particular target markup language; and,
   a formatter for formatting said extracted data for presentation in said presentation order using the second target markup language;
   wherein the content converter system is configured to
      receive a content request from the client, said content request specifying a network location from which a specified document including formatted content in the first markup language can be retrieved, said content request further indicating the second target markup language;
      respond to the content request by identifying a template which corresponds to said specified document and said target markup language using the template table;
      apply said template to said specified document and extract data from said formatted content based upon the template by identifying a presentation order of the at least one content marker in said template, and extracting the information in said data fields from said specified document in accordance with the presentation order; and format said information by the markup language application of the content converter system for presentation in said presentation order based upon said associated markup language tags, code, and additional text specified in the template, wherein said formatting produces a second document formatted for presentation according to the second target markup language.

2. The system of claim 1, wherein said templates have at least one content marker for locating data within said formatted content.

3. The system of claim 2, wherein said content marker has an identifier for identifying data within said formatted content.

4. The system of claim 1 wherein the first markup language is selected from the group consisting of hypertext markup language (HTML), extensible markup language (XML), standard generalized markup language (SGML), wireless markup language (WML), handheld device markup language (HDML), and VoiceXML.

5. The system of claim 1, said first markup language is a hypertext markup language (HTML).

6. The system of claim 1, wherein said target markup language is selected from the group consisting of hypertext markup language (HTML), extensible markup language (XML), standard generalized markup language (SGML), wireless markup language (WML), handheld device markup language (HDML), and VoiceXML.

7. The system of claim 1, wherein said target markup language is voice extensible markup language (VoiceXML).

8. The system of claim 1, wherein said first and target markup languages are of a different modality.

9. A non-transitory computer readable medium, having stored thereon a computer program having a plurality of code sections executable by a computer for causing the computer to perform a method for extracting data from a document formatted using a first markup language and presenting the extracted data using a second, different markup language with the steps of:

providing a content converter system operating as an interface between a client and a server, the content converter system including one or more templates for extracting data from documents, a template table associating each template with a network location identifier of a particular document and a particular target markup language, and a markup language application for reformatting the extracted data using a different markup language;

receiving a content request from the client by the content converter system, said content request specifying a network location from which a specified document including formatted content in the first markup language can be retrieved, said content request further indicating the second target markup language;

responsive to the content request, identifying a template which corresponds to said specified document and said target markup language using the template table, said template providing at least one content marker, wherein the at least one content marker indicates a data offset for identifying within the specified document one or more data fields containing information corresponding to at least one among a type of data and a particular action, wherein the template further specifies at least one among markup language tags, code, and additional text to associate with the information contained in a particular data field when presented in said target markup language, and wherein said template can be customized by a user to extract in one or more different combinations from the specified document information based upon the at least one content marker;

retrieving said specified document from said specified network location;

applying said template to said specified document and extracting data from said formatted content based upon the template, by:
identifying a presentation order of the at least one content marker in said template; and
extracting the information in said data fields from said specified document in accordance with the presentation order; and formatting said information by the markup language application of the content converter system for presentation in said presentation order based upon said associated markup language tags, code, and additional text specified in the template, wherein said formatting produces a second document formatted for presentation according to the second target markup language.

10. The non-transitory computer readable medium of claim 9, further causing the computer perform the steps of:
wherein said specified document is a Web page, wherein said client request is formatted using Hypertext Transfer Protocol (HTTP), and wherein said network location is specified as a URL corresponding to said Web page.

11. The non-transitory computer readable medium of claim 9, further causing the computer perform the steps of:
conveying said second document to said client;
presenting said second document through a user interface of said client.

12. The non-transitory computer readable medium of claim 11, wherein said user interface is a speech interface.

13. The non-transitory computer readable medium of claim 9, wherein said step of extracting information comprises reading data in said formatted content from an offset within said specified document, said offset identified by a content marker within said template.

14. The non-transitory computer readable medium of claim 13, further comprising reading a data identifier from said content marker.

15. The non-transitory computer readable medium of claim 9, wherein said first and said second markup language are a markup language selected from the group consisting of hypertext markup language (HTML), extensible markup language (XML), standard generalized markup language (SGML), wireless markup language (WML), handheld device markup language (HDML), and VoiceXML.

16. The non-transitory computer readable medium of claim 15, wherein said first markup language in at least one of a hypertext markup language (HTML) and extensible markup language (XML).

17. The non-transitory computer readable medium of claim 16, wherein said second target markup language is selected from the group consisting of wireless markup language (WML), handheld device markup language (HDML), and VoiceXML.

18. The non-transitory computer readable medium of claim 17, wherein said second target markup language is voice extensible markup language (VoiceXML).

19. The non-transitory computer readable medium of claim 9, wherein said second document and said specified document are of a different modality.

* * * * *